United States Patent
Tustin et al.

(10) Patent No.: US 7,144,537 B2
(45) Date of Patent: Dec. 5, 2006

(54) SHORT SHUTTLE MOLDING SYSTEM FOR MULTI-MATERIAL MOLDING

(75) Inventors: Richard Tustin, Mokena, IL (US); Adrian Looije, Burlington, VT (US)

(73) Assignee: Husky Injection Molding Systems Ltd., Bolton (CA)

( * ) Notice: Subject to any disclaimer, the term of this patent is extended or adjusted under 35 U.S.C. 154(b) by 274 days.

(21) Appl. No.: 10/423,292

(22) Filed: Apr. 25, 2003

(65) Prior Publication Data

US 2004/0212126 A1    Oct. 28, 2004

(51) Int. Cl.
*B29C 45/10* (2006.01)
*B29C 45/16* (2006.01)

(52) U.S. Cl. .............. 264/255; 264/297.2; 264/297.7; 264/297.8; 425/127; 425/588

(58) Field of Classification Search ................ 264/255, 264/297.2, 297.8, 328.7, 328.8, 334, 297.7; 425/556, 588, 127, 120, 572
See application file for complete search history.

(56) References Cited

U.S. PATENT DOCUMENTS

| | | | |
|---|---|---|---|
| 3,702,750 A | * | 11/1972 | Veneria ...................... 425/130 |
| 3,914,081 A | | 10/1975 | Aoki |
| 5,007,822 A | | 4/1991 | Hara et al. |
| 5,030,406 A | * | 7/1991 | Sorensen .................... 264/255 |
| 5,221,538 A | * | 6/1993 | Gasami et al. .............. 425/127 |
| 6,299,816 B1 | * | 10/2001 | Takemoto et al. .......... 264/250 |
| 6,372,170 B1 | * | 4/2002 | Nishida et al. ............. 264/255 |
| 6,398,537 B1 | | 6/2002 | Matysek |
| 6,428,730 B1 | * | 8/2002 | Nishida ...................... 264/255 |
| 6,468,458 B1 | * | 10/2002 | Anderson et al. ........... 264/246 |

* cited by examiner

Primary Examiner—Jill L. Heitbrink

(57) ABSTRACT

An apparatus and method for molding multi-material parts. The mold has a plurality of first mold cavities interspersed alternately among a plurality of second mold cavities. A first molten material is injected into the first mold cavities and solidified. Cores with the first material are moved only one mold pitch to the second mold cavities where a second molten material is injected and solidified with the first material to form the multi-material parts which are ejected from the mold when it is opened. In one embodiment, cavities and cores are arranged in a column, and dummy cores on each end of a column of cores close off the injection nozzle in an end cavity from which a core has been removed for a molding cycle. In another embodiment, cavities and cores are arranged radially, and cores are rotationally moved one mold pitch with each molding cycle.

12 Claims, 5 Drawing Sheets

SHORT SHUTTLE MOLDING SYSTEM FOR MULTI-MATERIAL MOLDING

BACKGROUND OF INVENTION

1. Field of the Invention

The present invention relates, generally, to injection molding systems. More particularly, the invention relates to sequential multi-material Injection molding where the product produced has a portion made of one material and another portion made of a different material.

2. Background Information

The injection molding process and equipment are well known. Molten material is injected into a space formed between a mold cavity and a core that together form a mold. A plurality of mold cavities are mounted on a cavity plate and a corresponding plurality of cores are mounted on a core plate so they align with the cavities. The distance between the centerlines of any two adjacent mold cavities is known as the "mold pitch". The injection molding machine typically moves the core plate relative to the cavity plate to open and close the mold between each "shot" of material into the mold to eject the molded parts. The parts typically remain on the core when the mold is opened and the parts are then ejected from the core.

Parts can be molded with different materials used for different portions of the part. The different materials may be, for example, different resins, or different colors of the same resin. To mold such parts, typically one portion is molded first, then that molded portion is transferred to a second cavity where the second portion is molded against the previously formed first portion. Such a processes described in U.S. Pat. No. 3,914,081 in which the cores are rotated between two molds, and U.S. Pat. No. 5,007,822 in which the cores are moved laterally between a first set of mold cavities and the second set of mold cavities. For molds having a large number of cavities, shuttling the cores laterally from one group of cavities to another group requires the set of cores to move a great distance along the mold. Such large movement takes time and thereby increases the molding cycle time, especially for large pitch molds or molds with a large number of cavities. Since such molds are fairly massive, their inertia influences the speed with which they can be safely moved in a molding machine.

Generally, it is desirable to reduce the molding cycle time as much as possible to maximize productivity. For multi-material molding, it is, therefore, desirable to minimize the time needed to shuttle cores from one set of molds to another. There is a need for a mold core shuttling system that can move from one set of cavities to another in a shorter time.

SUMMARY OF INVENTION

The present invention provides an apparatus and method for molding multi-material parts. The method comprises several steps. A first molten material is injected into a portion of a plurality of first mold cavities interspersed alternately among a plurality of second mold cavities in a mold and solidified. The mold is opened and the solidified material is retained on a plurality of mold cores. The mold cores are moved with the solidified material to the second mold cavities. The mold is closed and a second molten material is injected into a portion of the second mold cavities and solidified such that the first and second materials together form the multi-material part. The mold is opened and the multi-material parts are ejected.

With the first and second mold cavities interspersed alternately among each other, the mold cores are preferably moved, or shuttled, only an increment of one mold pitch for each molding cycle. In one embodiment the cavities and cores are arranged radially and the cores are moved clockwise or counterclockwise. In another embodiment the cavities and cores are arranged in a row and the cores are moved a first direction for one molding cycle, and a second direction opposite the first direction for the next molding cycle. Those directions may be substantially vertical or substantially horizontal.

The method may also include the step of preventing injection of molten material into a cavity from which a core have been moved. In one embodiment, this is accomplished by installing a dummy core into the cavity from which the core has been moved. The dummy core interfaces with an injection nozzle in the cavity to prevent the nozzle from injecting molten material during an injection cycle.

The molding apparatus includes a plurality of mold cavities of either a first configuration or a second configuration attached to a plate. The cavities of the first configuration are interspersed alternately among those of the second configuration. A plurality of mold cores are attached to a second plate and arranged to mate with the plurality of mold cavities of both the first and second configurations. The mold cores are movable between a first position and a second position relative to the mold cavities such that the second position is transposed from the first position one mold pitch. Means for moving the mold cores relative to the mold cavities is provided to shuttle the cores one mold pitch between each molding cycle.

In one embodiment the mold cavities are arranged in a row having first and second end cavities at opposite ends of the row. Each end cavity is of the second configuration. Each mold cavity has an injection nozzle associated with it. The injection nozzle has an outlet into the mold cavity for injection of molten material. The mold cores are also preferably arranged in a row having first and second dummy cores at opposite ends of the row such that with the cores in the first position the first dummy core aligns with the first end cavity. With the cores in the second position the second dummy core aligns with the second end cavity. The outlet of the injection nozzle associated with an end cavity is closed by the dummy core aligned with the end cavity when the mold is closed to prevent injection of molten material into the end cavity.

In another embodiment, the mold cavities are arranged radially, preferably to form a closed circle having an even number of cavities. There is no need for a dummy core with this configuration.

In both embodiments, the mold cores have ejector pins operating to only eject a part molded in a cavity of the second configuration.

BRIEF DESCRIPTION OF DRAWINGS

Exemplary embodiments of the present invention will now be described with reference to the accompanying drawings, in which.

DETAILED DESCRIPTION

Figure 1:
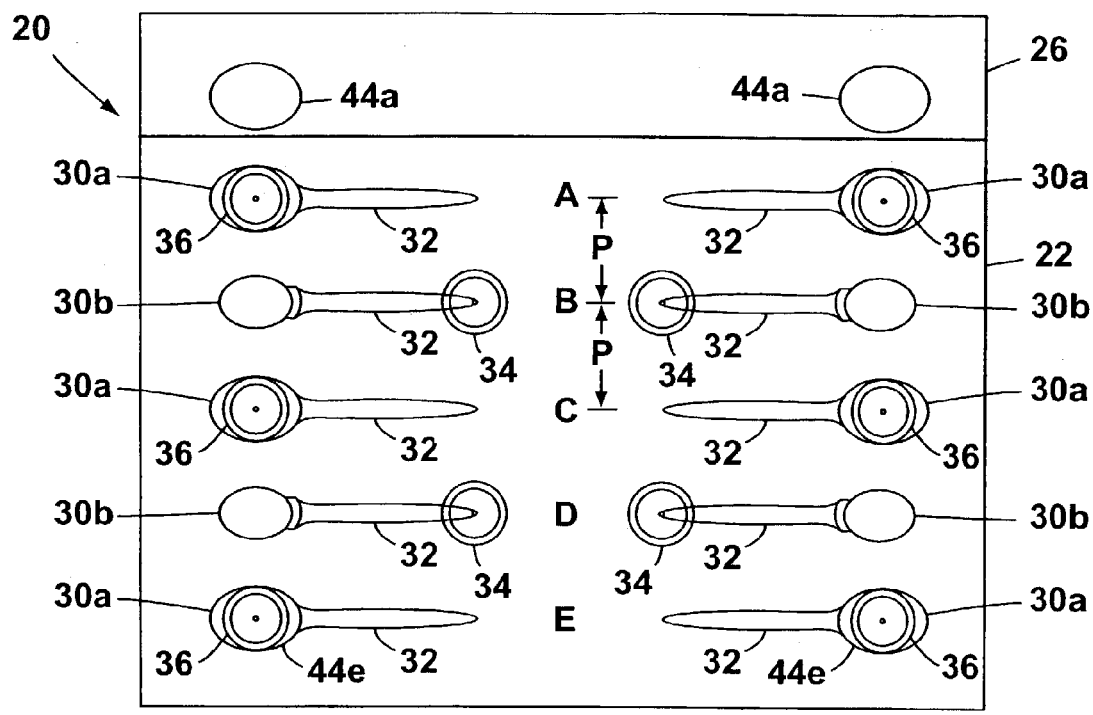
FIG. 1 is a schematic plan view of a mold with short shuttle system of the present invention showing locations of injection nozzles, mold cavities and dummy cores with the mold cores shuttled upward.
Figure 4:
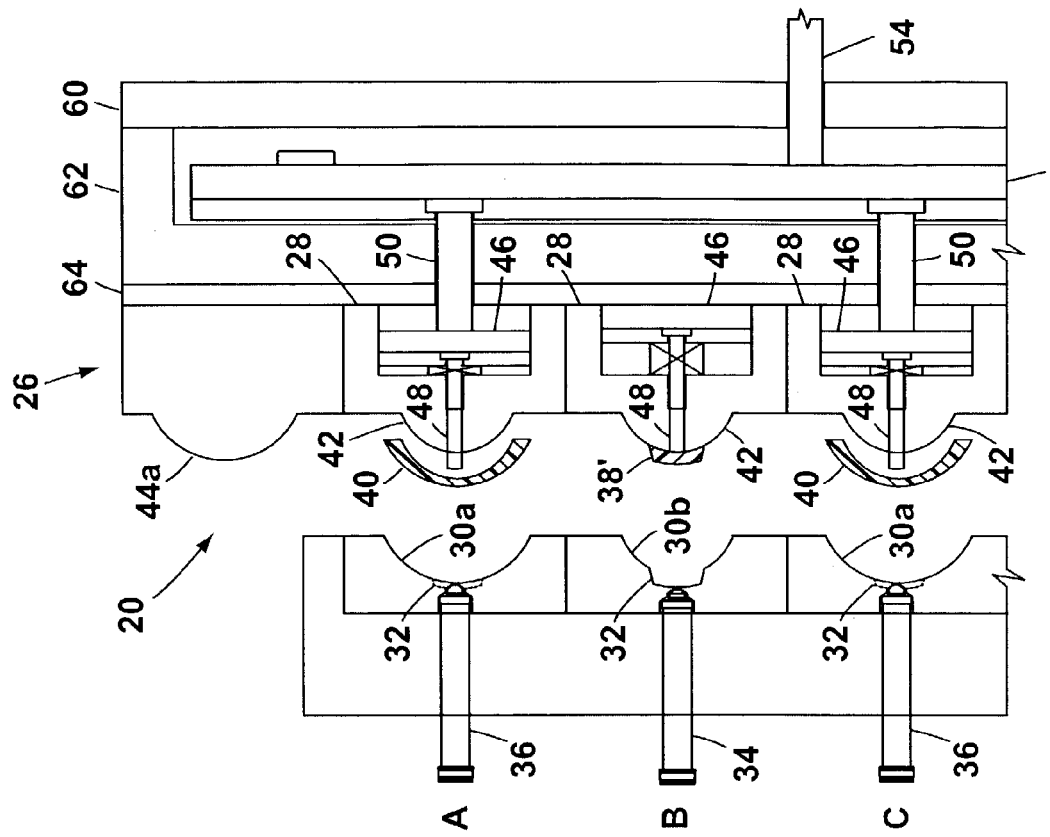
FIG. 4 is the view of FIG. 3 illustrating a mold-open condition after the first shot of material.
Figure 3:
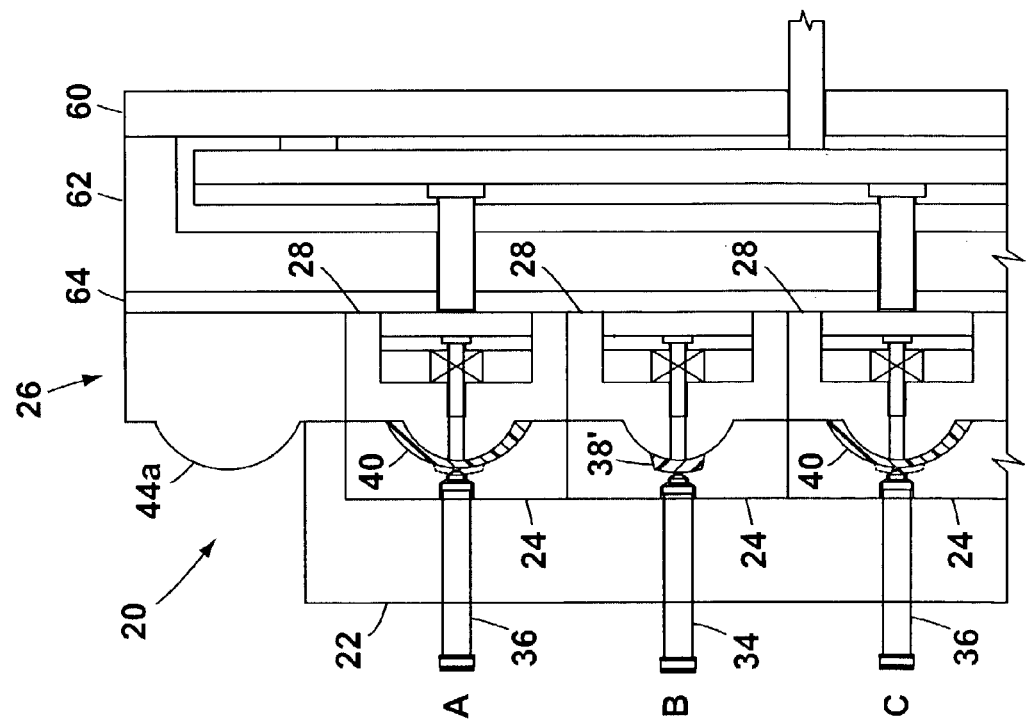
FIG. 3 is a schematic sectional view of the mold of FIG. 1 illustrating a mold-closed condition with the first shot of material.

Referring to FIGS. 1, 3, and 4 an example of the preferred embodiment of the present invention is illustrated and generally indicated by the reference numeral 20. A multi-cavity mold to form a spoon made of two materials, such as two colors of the same resin, is shown as an example of a part that can be molded using the short shuttle molding system 20 of the present invention. It will be clear to one skilled in the art that the invention can be applied to any configuration of part where different portions of the part are made from different materials and which requires two sets of mold cavities. Also, the mold shown has five cavities arranged in a column vertically with five adjacent cavities mirrored across the mold. It will also be clear to one skilled in the art that a mold may have a greater number of cavities both vertically and horizontally, and that the greater the number of cavities, the greater will be in the significance of this invention.

Short shuttle molding system 20 comprises a cavity plate assembly 22 with a plurality of mold cavities 24 preferably attached to a fixed platen of an injection molding machine (not shown), and a core plate assembly 26 having a plurality of mold cores 28 preferably attached to a movable platen 60 of the injection molding machine as is well known. Some of the mold cavities 24 have a first configuration, and the remaining mold cavities 24 have a second configuration. Those of the second configuration are interspersed alternately among those of the first configuration with a spacing, or mold pitch, P as indicated by the distance "P" in FIG. 1. The mold cores are arranged to mate with the mold cavities of both the first and second configurations, and are movable between a first position and a second position relative to the mold cavities such that the second position is transposed from the first position one mold pitch.

The core plate assembly 26 also includes a means to selectively shuttle the mold cores 28 an increment of one mold pitch relative to the mold cavities 24 to facilitate sequential injection of two materials to form different portions of a molded part.

Mold cavities are arranged in a column of rows labeled A–E vertically. Each spoon mold cavity 24 has a scoop portion 30 and a handle portion 32. In the example illustrated, the handle portions 32 are the same in all cavities because the handle portion 32 is the first portion molded. A handle injection nozzle 34 services alternate handle portions 32 of the mold, in this example cavities in rows B and D.

Handles 38 are only molded in the handle portions 32 of the mold cavities 24 having handle injection nozzles 34. A scoop injection nozzle 36 services alternate scoop portions 30 of the mold, in this example cavities in rows A, C, and E. The scoop portion 30a is larger in those cavities in rows A, C, and E, where a scoop 40 is molded, than scoop portion 30b in cavities for rows B and D where only a handle 38 is molded. The rows of cavities in which the handles 38 are molded are interspersed alternately among the rows of cavities in which the scoops 40 are molded.

Mold cores 28 have core shapes 42 designed to properly mate with the spoon portion 30 and handle portion 32 of mold cavities 24 to form the parts. Preferably, all of the core shapes 42 are identical. When the mold cores 28 are shuttled between the first and second positions, such movement would leave one of the end cavities in rows A or E without a core depending on whether the cores were in the first position or the second position. Placing an additional mold core 28 with a core shape 42 in this roe of cavities for this molding cycle would not be beneficial since there would be no handle molded on the core, and the material injected into the spoon portion 30a would be wasted. If the scoop injection nozzles 36 in cavities in row A and E are valve gate type nozzles, the action of the valve gate can be synchronized with the movement of the cores to prevent injection of molten material into the cavity from which the core has been moved.

In the more likely case where the scoop injection nozzles 36 are hot-tip type, a small plug of frozen material remains at the outlet 66 of the nozzle 36, and is expelled at the next injection cycle. To prevent injection of molten material into the cavity from which the core has been moved, which, in this embodiment, are cavities in rows A and E, additional dummy cores 44 are located in the row of cores outboard of core shapes 42. Dummy cores 44 are larger than core shapes 42 and are intended to mate with spoon portion 30a in the end cavities of rows A and E to alternately shut off scoop injection nozzles 36 in cavities of rows A and E as the mold cores 28 are shuttled vertically back and forth one mold pitch. Through a close fit between dummy core 44 and spoon portion 30a of cavity 24, dummy core 44 can be brought into contact with the plug of frozen material and prevent the plug from being expelled from the nozzle 36 during the injection cycle. Dummy core 44 may have a detail for specific interface with the nozzle tip to facilitate retaining the plug at the nozzle tip. The detail may include specific geometry to receive the tip, or specific material properties to best interface with the tip.

FIGS. 3–8 illustrate an operational sequence for molding parts using the present invention. In FIG. 3, mold cores 28 are in their upper position and the mold is closed. A row of dummy cores 44a extends above cavity plate assembly 22 and is not used. Another row of dummy cores 44e mates with the scoop portion 30a of lower most row E of cavities (shown in FIG. 1) thereby preventing injection in those cavities. During this injection cycle, scoops 40 may be produced in cavities in rows A and C by scoop injection nozzles 36, and handles 38' may be produced in cavities in rows B and D by handle injection nozzles 34.

In FIG. 4, the mold is opened and the scoops 40 on mold cores 28 opposite cavities in rows A and C are ejected. Mold cores 28 have ejector plates 46 which push the ejector pins 48 to eject parts off of core shapes 42. Ejector plates 46 are actuated by knockout pins 50 which are actuated by the main the ejector plate 52 that is moved by machine knockout rod 54. The knockout pins 50 move through core backing plate 62 and core plate 64, and are arranged such that they only actuate ejector plates 46 serving mold cores 28 opposite cavities in rows A, C and E. Thus, on the first shot, scoops 40 will be ejected and handles 38' will remain on core shapes 42 opposite cavities B and D.

Since there is no handle portion in the cavities of rows A and C for the first shot, the scoop portion, if injected, would be wasted. It is preferred to deactivate the injection unit that provides molten material to the scoop portions until injection of the handle portions are functioning properly. Cores 42 with handles 38' molded on them can be shuttled to positions adjacent rows A, C and E then the handles ejected from the cores using manual machine control until the proper molding of handles 38' is achieved.

Figure 2:
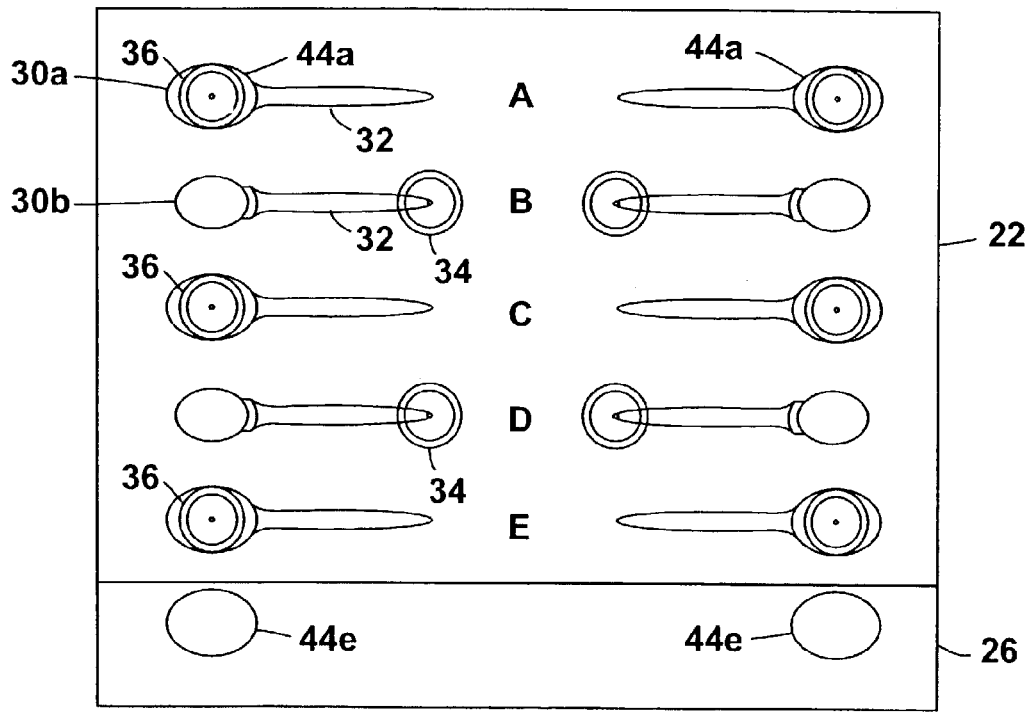
FIG. 2 is the view of FIG. 1 with the mold cores shuttled downward.
Figure 6:
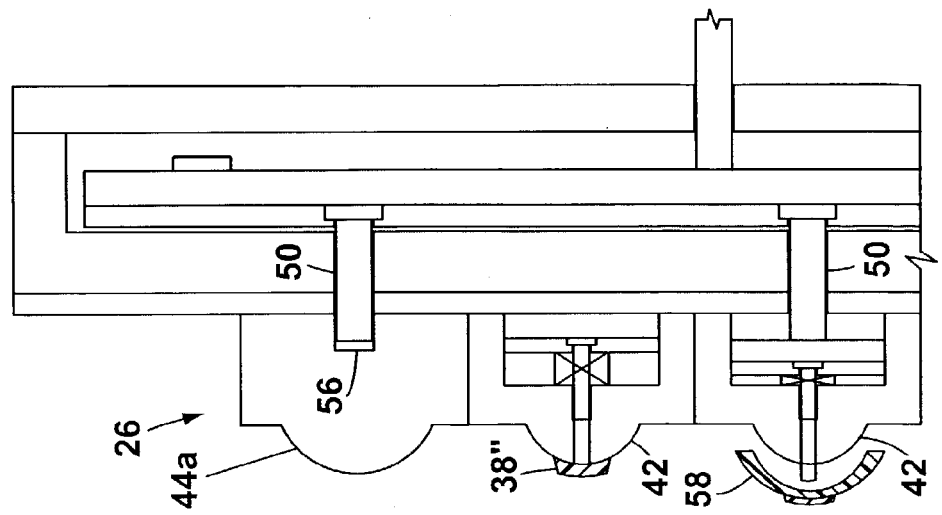
FIG. 6 is the view of FIG. 5 illustrating a mold-open condition after the second shot of material.
Figure 5:
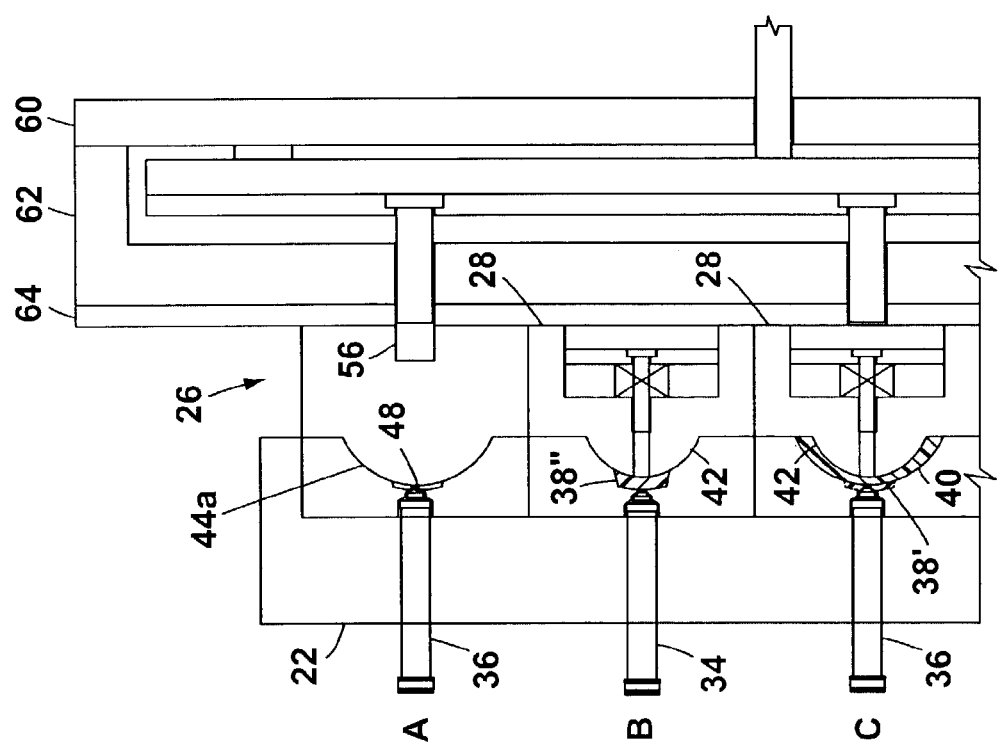
FIG. 5 is a schematic sectional view of the mold of FIG. 2 illustrating a mold-closed condition with the second shot of material.

Referring to FIGS. 2, 5 and 6, when handles 38' are properly molded, the mold cores 28 and dummy cores 44 are then shuttled vertically downward one mold pitch and the mold is closed. Mechanisms to facilitate such shuttling are well known. Mold cores 28 and dummy cores 44 can be moved relative to core plate 64, as illustrated, by well-known means, such as mounting mold cores 28 and dummy cores 44 on slide rails (not shown) attached to core plate 64 and moving them by mechanical linkages or by hydraulic or air actuators. Alternatively, mold cores 28 and dummy cores 44 can be fixed to core plate 64, and core plate 64 may be moved relative to core backing plate 62 by similar means.

With the cores shuttled downward, dummy cores 44a are received in cavities at row A, thereby closing off the outlet 66 of scoop injection nozzles 36 for those cavities and preventing material from being injected in them. The core shapes 42 that were opposite cavities of rows A and C for the first injection cycle were wither not used or had scoops 40 ejected, so they are clean and now are moved into position at cavities at rows B and D for injection of handles. The handles 38' that were previously formed in cavities at rows B and D remain on core shapes 42 and are now moved down to cavities at rows C and E. During the second injection cycle, new handles 38" are formed in cavities at rows B and D, and scoops 40 are injected onto handles 38' in cavities at rows C and E. When the mold is opened, as shown in FIG. 6, again only the two-part spoons 58 opposite cavities in rows C and E are ejected. Dummy cores 44 each have a recess 56 to receive knockout pin 50 during the ejection process. The handles 38" molded in cavities at rows B and D remain on their core shapes 42.

Figure 7:
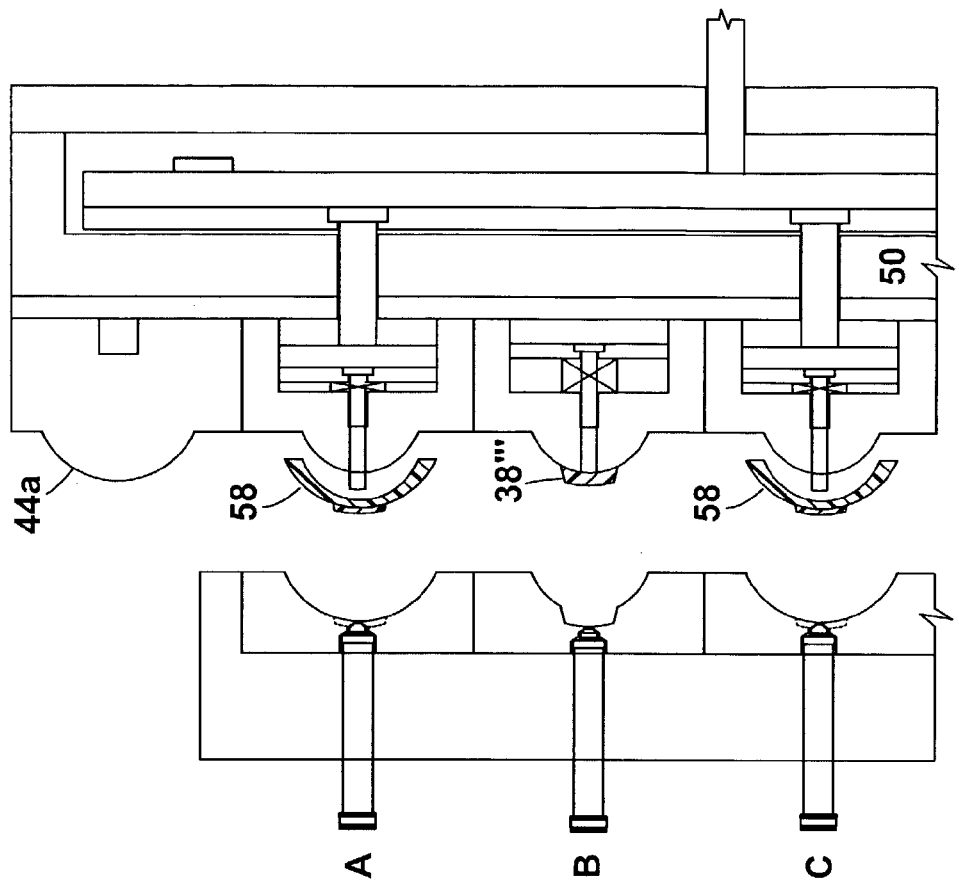
FIG. 7 is a schematic sectional view of the mold of FIG. 1 illustrating a mold-closed condition with the third shot of material.
Figure 8:
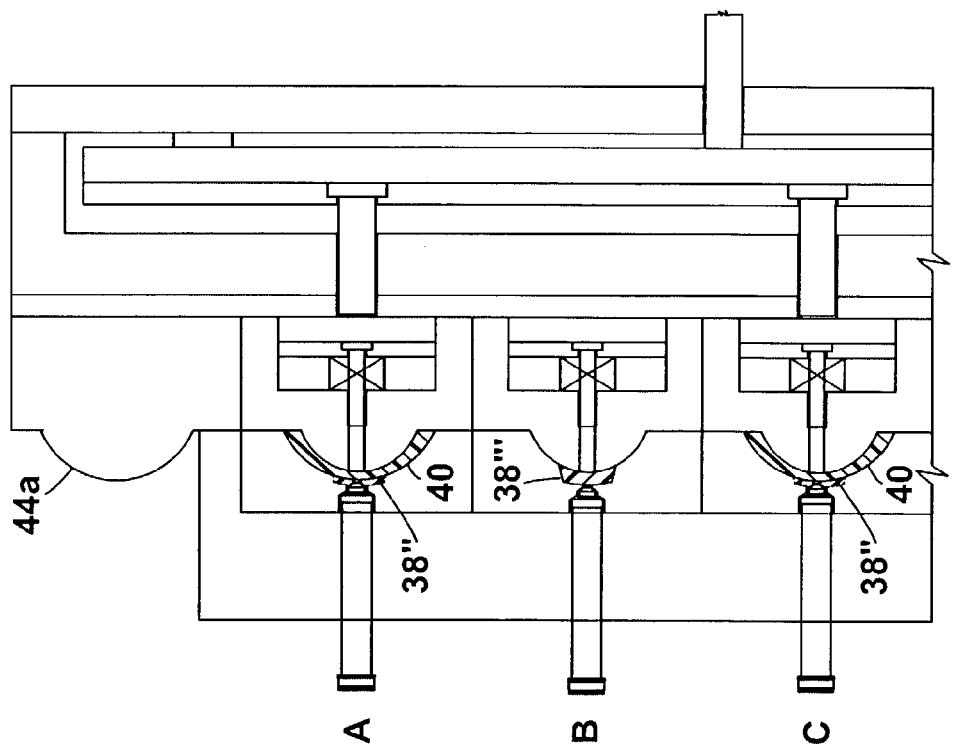
FIG. 8 is the view of FIG. 7 illustrating a mold-open condition after the third shot of material.

Referring to FIGS. 1, 7 and 8, the mold cores 28 and dummy cores 44 are then shuttled back vertically upward one mold pitch and the mold is again closed. Cavities at rows A and C now have core shapes 42 with handles 38" ready for molding scoops, cavities at rows B and D have clean cores ready for molding new handles 38'", and cavities at row E are closed by dummy cores 44e. This injection cycle produces nothing in cavities at row E, handles in cavities at rows B and D, and two-part spoons 58 in cavities at rows A and C which are ejected as shown in FIG. 8.

The process is then repeated, shuttling the cores downward, molding, and ejecting; then shuttling the cores upward, molding, and ejecting. Cavities at intermediate row C will eject a two-part spoon 58 with every cycle because those cavities receive a molded handle 38 from either direction as the mold cores 28 are shuttled. Cavities at end rows A and E only produce completed two-part spoons 58 every other cycle since they only receive a molded handle 38 from one direction. Thus, it is readily seen that molds having many intermediate rows of cavities with fewer end rows of cavities will be more efficient at using the present invention. Also, in the embodiment illustrated, cavities and cores are arranged such that the cores are shuttled vertically. It is readily apparent that within the scope of this invention, cores and cavities can be arranged such that cores are shuttled horizontally.

Figure 9:
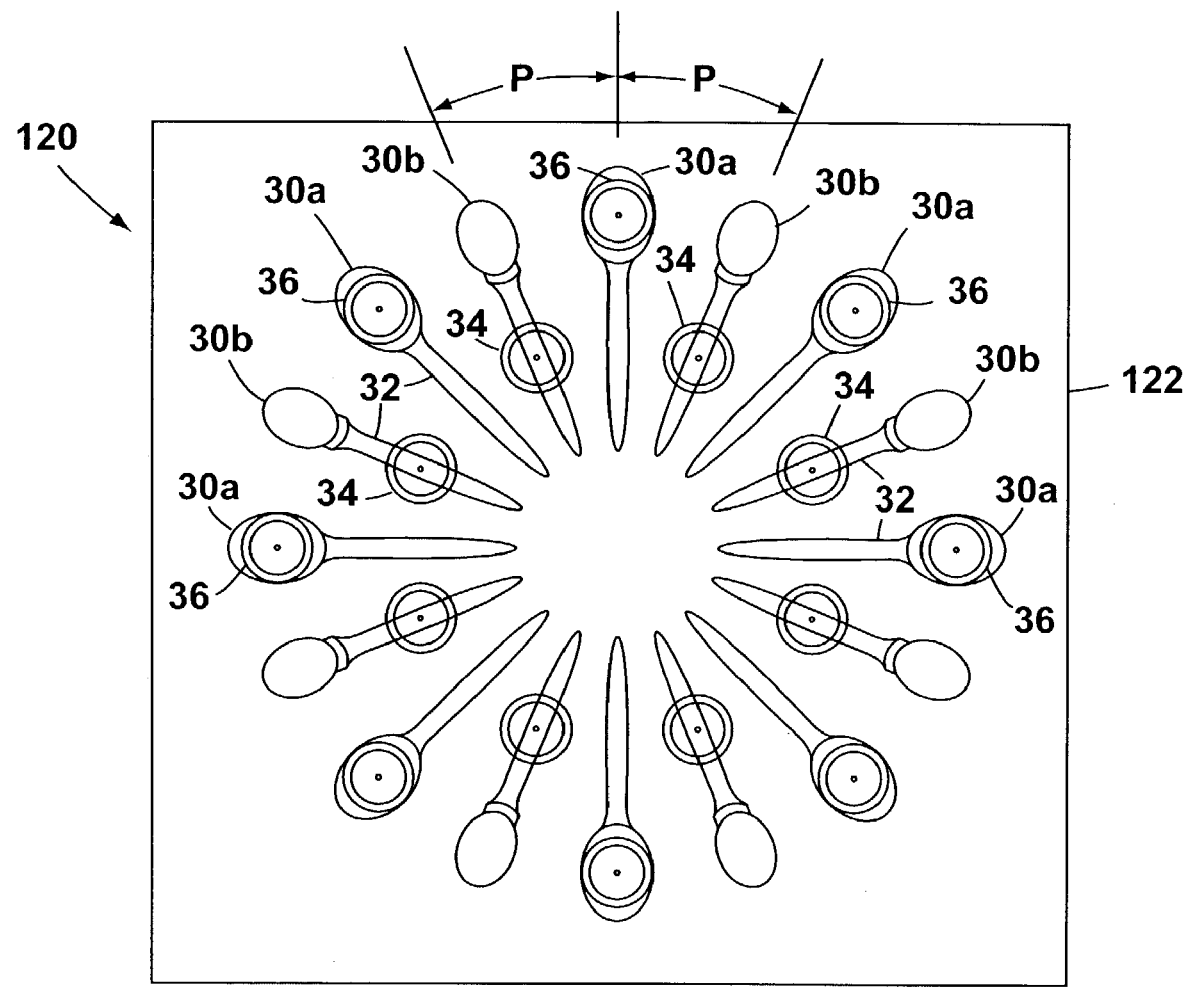
FIG. 9 is a schematic plan view of another embodiment of a mold with short shuttle system of the present invention showing locations of injection nozzles and mold cavities arranged radially.

Referring to FIG. 9, another embodiment of the short shuttle molding system 120 arranges the plurality of cavities radially on the cavity plate assembly 122, preferably to form a closed circle having an even number of cavities. Again, cavities of a first configuration are interspersed alternately among cavities of a second configuration. Handle portions 32 are identical for each cavity, but spoon portions 30a and 30b alternate around the radial configuration. All cores are identical for this radial cavity arrangement, and there is no need for dummy cores. Handles are molded in cavities having an injection nozzle 34 associated with handle portion 32. The cores are retracted with the solidified handles, rotated either clockwise or counterclockwise one mold pitch, P, and reengaged with the cavities. The scoops are then molded onto the handles in cavities with spoon portions 30a and injection nozzles 36 while new handles are molded in the remaining cavities. During each molding cycle, the cores are rotationally indexed one mold pitch, such as by a ratchet mechanism. The rotational direction may be continuously clockwise, continuously counterclockwise or alternately clockwise and counterclockwise.

In the embodiment illustrated, eight cavities of a first configuration are shown interspersed among eight cavities of a second configuration. This number may be greater or lesser depending on the configuration of the part being molded. Also, the radial configuration of cavities and cores may be a single group, with multiple groups repeated on the mold.

The present invention shuttles the mold cores 28 only one mold pitch for each molding cycle, thereby reducing the overall mold cycle time and increasing productivity over prior art molding systems for sequential multi-material injection.

It will, of course, be understood that the above description has been given by way of example only and that modifications in detail may be made within the scope of the present invention.

What is claimed is:

1. A method of injection molding multi-material parts, comprising the steps of:
    (a) injecting a first molten material into a portion of a plurality of first mold cavities interspersed alternately among a plurality of second mold cavities in a mold and solidifying the molten material;
    (b) opening the mold and retaining the solidified material on a plurality of mold cores;
    (c) moving the mold cores with the solidified material to the second mold cavities and closing the mold;
    (d) injecting a second molten material into a portion of the second mold cavities and solidifying the molten material such that the first and second materials together form the multi-material part;
    (e) opening the mold and ejecting the multi-material parts;
    (f) preventing injection of molten material into a cavity from which a core have been moved; and
    (g) wherein the injection of molten material is prevented by installing a dummy core into at least one of the mold cavities from which at least one of the mold cores has been moved, the dummy core interfacing with an injection nozzle in the cavity to prevent the nozzle from injecting molten material during an injection cycle.

2. The method of claim 1, wherein the mold cores are moved one mold pitch for each molding cycle.

3. The method of claim 1, wherein the mold cores are moved a first direction for a molding cycle, and a second direction opposite said first direction for the next molding cycle.

4. The method of claim 3, wherein the first and second directions are oriented substantially vertical.

5. The method of claim 3, wherein the first and second directions are oriented substantially horizontal.

6. The method of claim 1, further comprising the step of preventing injection of molten material into at least one of the plurality of mold cavities from which at least one of the plurality of mold cores has been moved.

7. An injection molding apparatus, comprising:
a plurality of mold cavities attached to a first plate, the cavities having either a first configuration or a second configuration for receiving and solidifying molten material, those of the first configuration being interspersed alternately among those of the second configuration;
a plurality of mold cores attached to a second plate and arranged to mate with the plurality of mold cavities of both the first and second configurations, the mold cores being movable between a first position and a second position relative to the mold cavities such that the second position is transposed from the first position one mold pitch, the plurality of mold cores moving said solidified material formed in the first or second configuration to the plurality of mold cavities in the other of the first or second configuration;
means for moving the mold cores relative to the mold cavities so that the cores are shuttled one mold pitch between each molding cycle; and
at least one dummy core for precluding molten material from flowing into at least one of the mold cavities by installing the at least one cummy core into the mold cavity.

8. The apparatus of claim 7, wherein the mold cavities are arranged in a column having first and second end cavities at opposite ends of the column, each end cavity being of the second configuration.

9. The apparatus of claim 8, wherein the mold cores are arranged in a column having first and second dummy cores at opposite ends of the column such that with the cores in the first position the first dummy core aligns with the first end cavity, and with the cores in the second position the second dummy core aligns with the second end cavity.

10. The apparatus of claim 7, wherein the mold cores have ejector pins operating to only eject a part molded in a cavity of the second configuration.

11. An injection molding apparatus, comprising:
a plurality of mold cavities attached to a first plate, the cavities having either a first configuration or a second configuration for receiving and solidifying molten material, those of the first configuration being interspersed alternately among those of the second configuration;
a plurality of mold cores attached to a second plate and arranged to mate with the plurality of mold cavities of both the first and second configurations, the mold cores being movable between a first position and a second position relative to the mold cavities such that the second position is transposed from the first position one mold pitch, the plurality of mold cores moving said solidified material formed in the first or second configuration to the plurality of mold cavities in the other of the first or second configuration;
means for moving the mold cores relative to the mold cavities so that the cores are shuttled one mold pitch between each molding cycle;
wherein the mold cavities are arranged in a column having first and second end cavities at opposite ends of the column, each end cavity being of the second configuration;
wherein the mold cores are arranged in a column having first and second dummy cores at opposite ends of the column such that with the cores in the first position the first dummy core aligns with the first end cavity, and with the cores in the second position the second dummy core aligns with the second end cavity; and
wherein each mold cavity has an injection nozzle associated with it, the injection nozzle having an outlet into the mold cavity for injection of molten material, and wherein the outlet of the injection nozzle associated with an end cavity is closed by the dummy core aligned with the end cavity when the mold is closed to prevent injection of molten material into the end cavity.

12. An injection molding apparatus, comprising:
a plurality of mold cavities of a second configuration for receiving and solidifying molten material and arranged in a column and attached to a first plate, the column having first and second end cavities at opposite ends of the column;
a plurality of mold cavities of a first configuration for receiving and solidifying molten material and attached to the first plate and interspersed alternately among the mold cavities of the second configuration;
a plurality of mold cores attached to a second plate and arranged in a column to mate with the plurality of mold cavities of both the first and second configurations, the mold cores being movable between a first position and a second position relative to the mold cavities such that the second position is transposed from the first position one mold pitch, the column of mold cores having a first dummy core and a second dummy core each at opposite ends of the column such that with the cores in the first position, the first dummy core aligns with the first end cavity, and with the cores in the second position the second dummy core aligns with the second end cavity, the plurality of mold cores not having either of the first or second dummy cores moving said solidified material formed in either the first or second configuration to the cavities of the other of the first or second configuration; and
means for moving the mold cores relative to the mold cavities so that the cores are shuttled one mold core between each molding cycle.

* * * * *